(12) United States Patent
Wang

(10) Patent No.: US 7,284,801 B2
(45) Date of Patent: Oct. 23, 2007

(54) STEEL RING ADJUSTMENT STRUCTURE OF A WHEEL COVER

(76) Inventor: Hung-Sheng Wang, No. 29, Lane 766, Sec. 1, Jungjeng Rd., Rende Shiang, Tainan (TW)

( * ) Notice: Subject to any disclaimer, the term of this patent is extended or adjusted under 35 U.S.C. 154(b) by 140 days.

(21) Appl. No.: 11/262,722

(22) Filed: Nov. 1, 2005

(65) Prior Publication Data

US 2007/0096544 A1    May 3, 2007

(51) Int. Cl.
*B60B 7/12* (2006.01)

(52) U.S. Cl. ............................ 301/37.33; 301/37.32

(58) Field of Classification Search .......... 301/37.101, 301/37.102, 37.31, 37.32, 37.33, 37.34, 37.42
See application file for complete search history.

(56) References Cited

U.S. PATENT DOCUMENTS 5,064,249 A * 11/1991 Hung .................... 301/37.42
5,700,062 A * 12/1997 Wang .................... 301/37.33
5,895,166 A *  4/1999 Tsai ...................... 403/4
6,099,082 A *  8/2000 Wang .................... 301/37.33
6,139,114 A * 10/2000 Wang .................... 301/37.33
6,425,640 B1 *  7/2002 Hussaini ................ 301/37.33
6,663,188 B2 * 12/2003 Sumi et al. ............ 301/37.33

* cited by examiner

*Primary Examiner*—Jason R. Bellinger
*Assistant Examiner*—Kip Kotter
(74) *Attorney, Agent, or Firm*—Rosenberg, Klein & Lee

(57) ABSTRACT

A wheel cover has several equidistant securing parts near to an edge, which each have a detained portion on an outward side thereof; a first one of the securing parts has an inwards-facing protruding portion; the first securing part has several holes on each of two ends of the detained portion and the protruding portion; a steel ring is inserted in chosen ones of the holes at two free ends and tightly pressed against all the securing parts except the first one such that free ends of the securing parts are radially outwardly displaced, and the securing parts are tightly pressed against an inward edge of a wheel to prevent the wheel cover from falling off; the holes of the first securing part are coplanar therefore there won't be reduction in the moment arm of force when changing steel rings and using other ones of the holes for connection.

1 Claim, 7 Drawing Sheets

STEEL RING ADJUSTMENT STRUCTURE OF A WHEEL COVER

BACKGROUND OF THE INVENTION

1. Field of the Invention

The present invention relates to a steel ring adjustment structure of a wheel cover, more particularly one, which allows the wheel cover to be firmly held on a wheel without risk of falling off even when the original steel ring used thereon is replaced with a new one having a different size from the original one.

2. Brief Description of the Prior Art

Wheel covers are secured on wheels to make the wheels more pleasant-looking. Referring to FIGS. 7 and 8, a conventional wheel cover 4 has several securing parts 41 equidistantly spaced apart near to an edge thereof, which each have a holding space 411 on an inward side. A first one of the securing parts 41 is formed with a hole 412 on one end, and two holes 413 and 414 on the other ends, which are at different distance from the surface of the wheel cover 4, and have different lengths. A C-shaped steel ring 42 is inserted in the hole 412 at one of the free ends, and one of the holes 413 and 414 at the other free end, and fitted in the holding spaces 411 such that the free ends of the securing parts 41 are radially outwardly displaced, and the securing parts 41 are tightly pressed against an inward edge of a wheel to prevent the wheel cover 4 from falling off. When the steel ring 42 is replaced with a new one having a different size from the original one 42, the new steel ring can outwardly displace the free ends of the securing parts 41 effectively by choosing and using a suitable one among the holes 413 and 414 for connection.

Referring to FIGS. 9 and 10, another conventional wheel cover 5 has several securing parts 51 equidistantly spaced apart near to an edge thereof, which each have a holding space 511 on an inward side. A first one of the securing parts 51 has a hole 512 on each of two ends thereof, and a hole 513 on each of the two ends thereof; the holes 513 and 512 are at different distance from the surface of the wheel cover 4, and have different lengths. A C-shaped steel ring 52 is inserted in chosen ones of the holes 512, 513 at two free ends thereof such that the free ends of the securing parts 51 are radially outwardly displaced, and the securing parts 51 are tightly pressed against an inward edge of a wheel to prevent the wheel cover 5 from falling off. Because the holes 512 and 513 have different lengths, steel rings of different sizes can be used on the wheel cover 5 by choosing and using suitable ones among the holes 512 and 513 for connection with the steel ring 52.

However, the different-length holes 512 and 513 are at different distance from the surface of the wheel cover 5, moment arms of force will be different when steel rings are inserted in different holes 512, 513; a steel ring inserted in the holes 513 will have a shorter moment arm of force, and in turn the steel ring's moment of force won't be great enough to outwardly displace the free ends of the securing parts 51 effectively. And, the first conventional wheel cover also has the same disadvantage.

SUMMARY OF THE INVENTION

It is a main object of the invention to provide an improvement on a wheel cover to overcome the above-mentioned problem. The wheel cover of the present invention has several equidistant securing parts near to an edge, which each have a holding space on an inward side, and a detained portion on an outward side thereof. A first one of the securing parts has an inwards-facing protruding portion, and several holes on each of two ends of the detained portion and each of two ends of the protruding portion. A steel ring, which has a gap, is inserted in suitable ones of the holes at two free ends and fitted in the holding spaces except that of the first securing part such that all free ends of the securing parts are outwards displaced, and the securing parts are tightly pressed against an inward edge of a wheel with the detained portions being detained in the wheel to prevent the wheel cover from falling off. The holes of the first securing part are coplanar, i.e. at a same distance from the surface of the wheel cover, therefore there can't be reduction in moment arm of force when changing steel rings and using other ones of the holes for connection with the steel ring instead.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
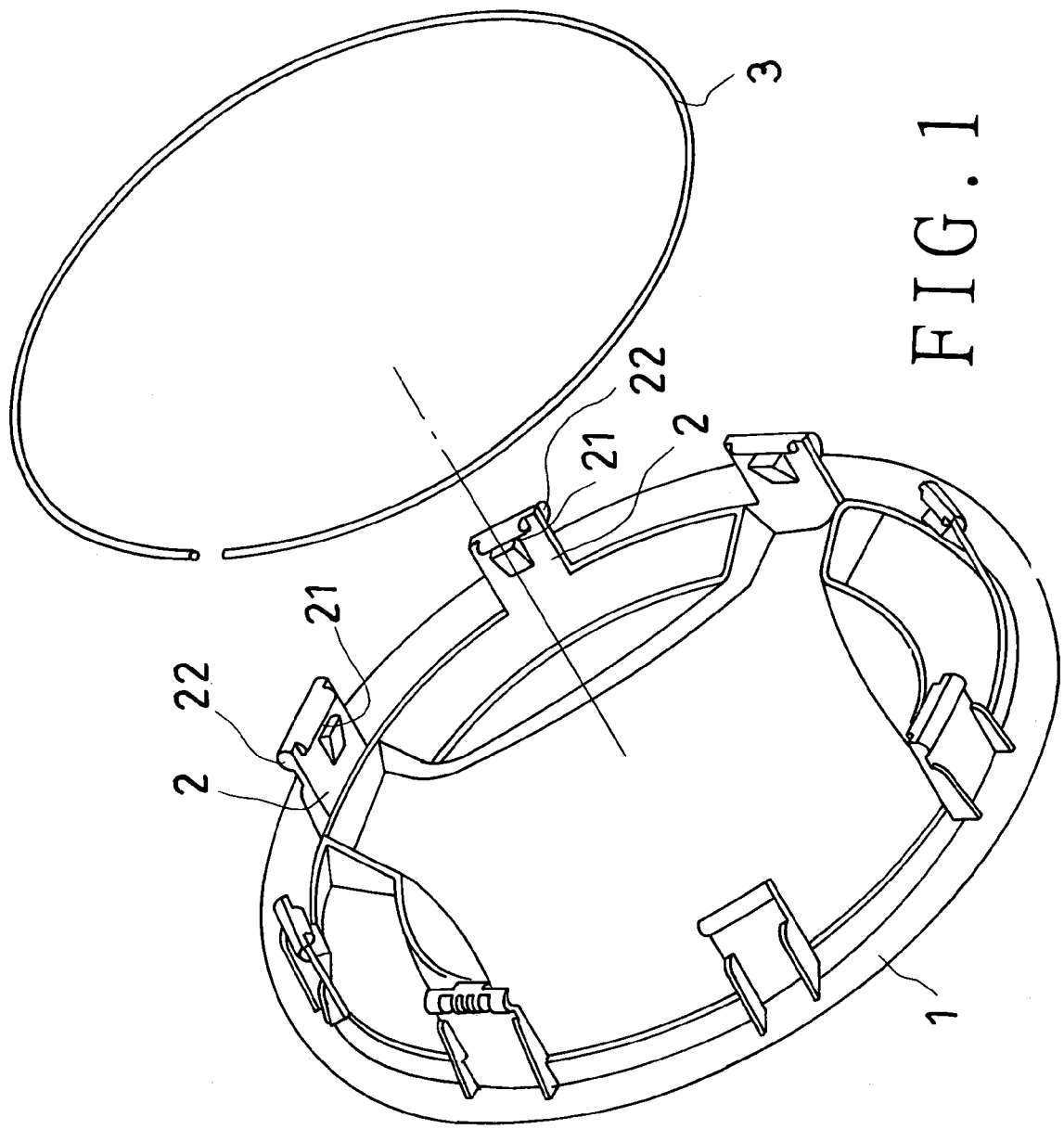
FIG. 1 is a perspective view of a first preferred embodiment of a wheel cover in the present invention.
Figure 2:
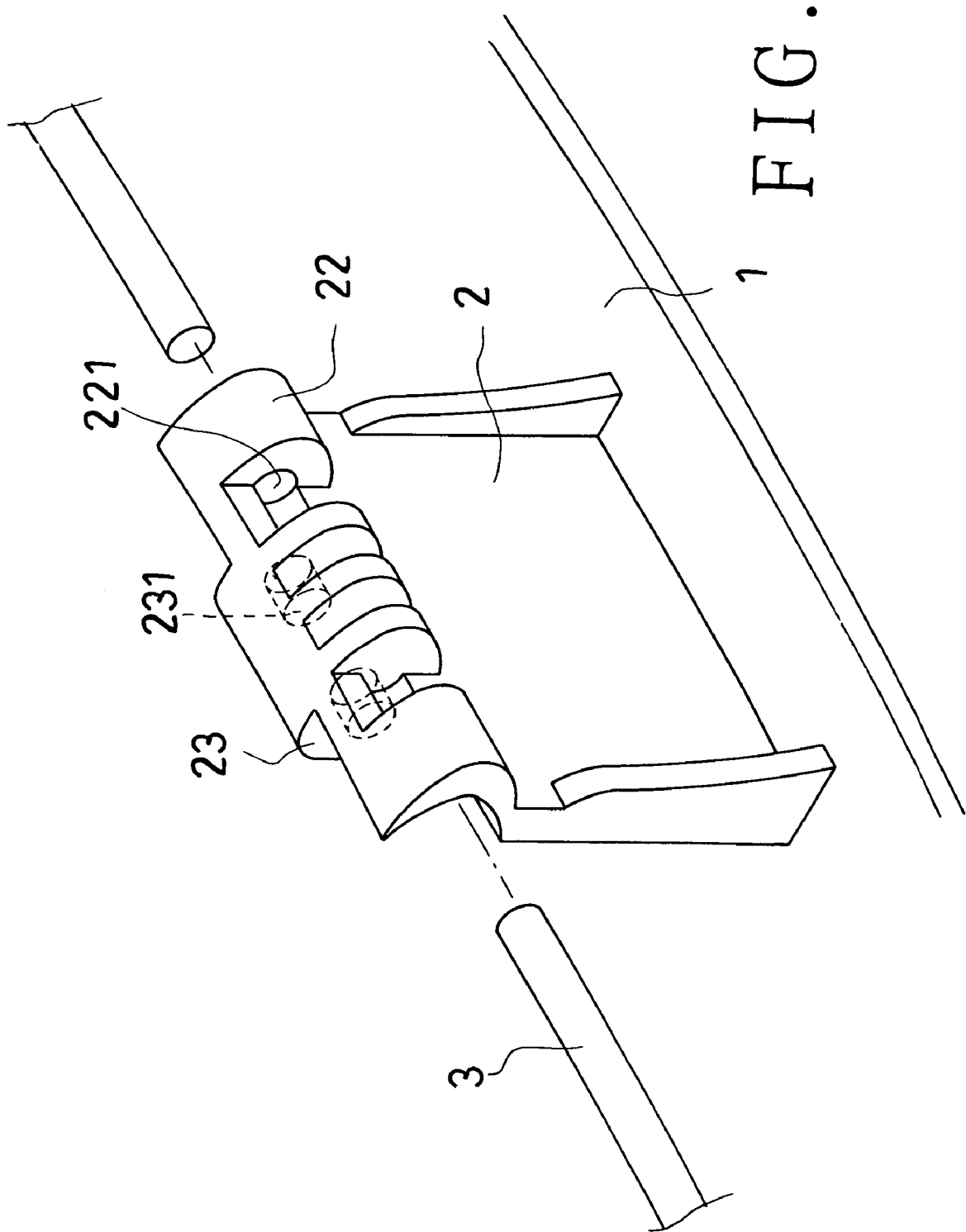
FIG. 2 is a partial perspective view of the first embodiment.
Figure 3:
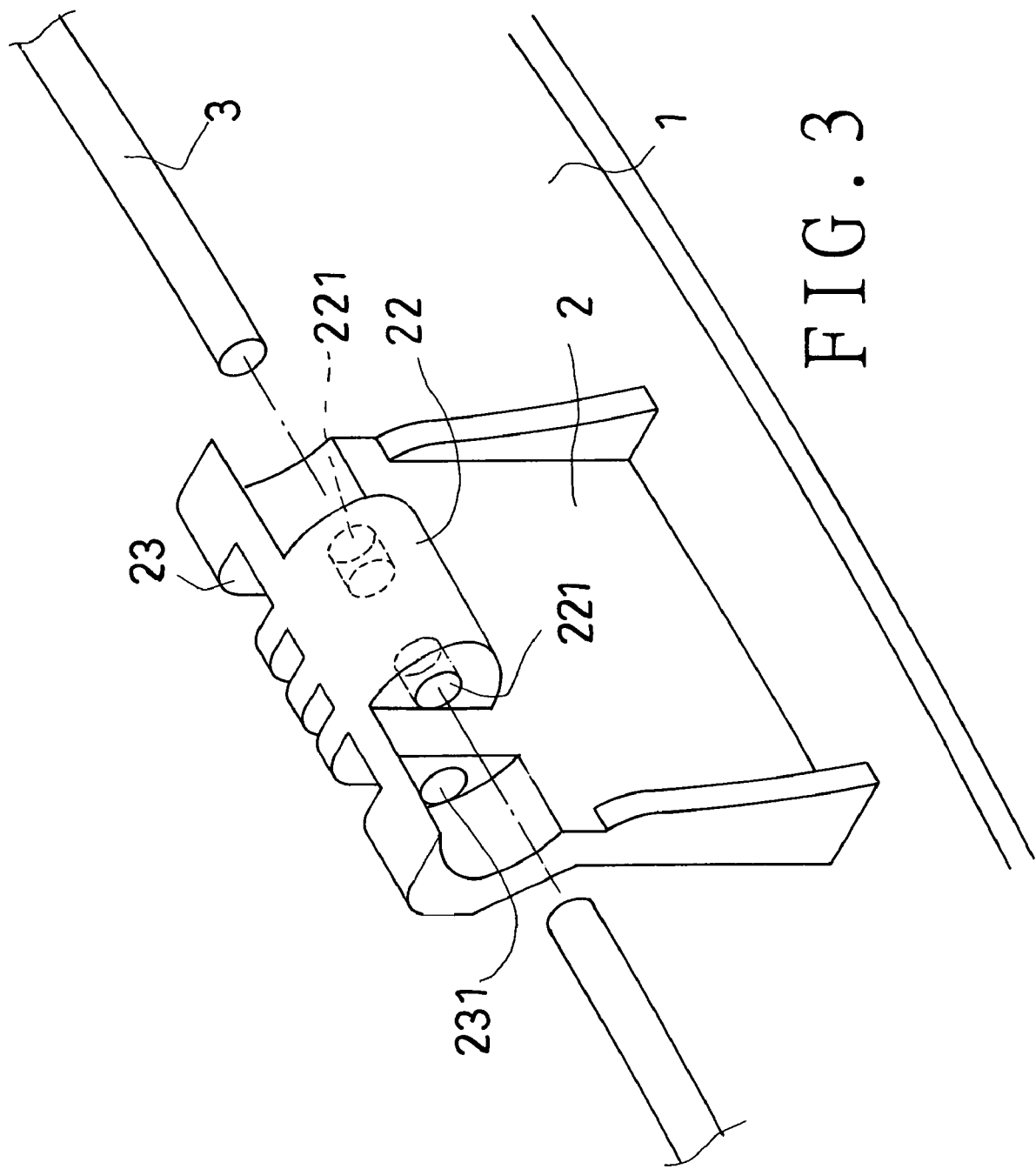
FIG. 3 is a partial perspective view of the second embodiment.

Referring to FIG. 1 to 3, a preferred embodiment of a wheel cover 1 in the present invention has several securing parts 2 equidistantly spaced apart near to an edge thereof. The securing parts 2 each have a holding space 21 on an inward side thereof, and a detained portion 22 on an outward side of a free end thereof. In addition, a first one of the securing parts 2 is formed with a protruding portion 23 on the inward side, and it has several holes 221 on each of two ends of the detained portion 22 thereof; the protruding portion 23 has several holes 231 on each of two ends thereof, and the holes 231 and 221 of the protruding portion 23 and the detained portion 22 are at substantially the same distance from the surface of the wheel cover 1. In other words, the holes 221 and 231 are on the same plane.

Figure 4:
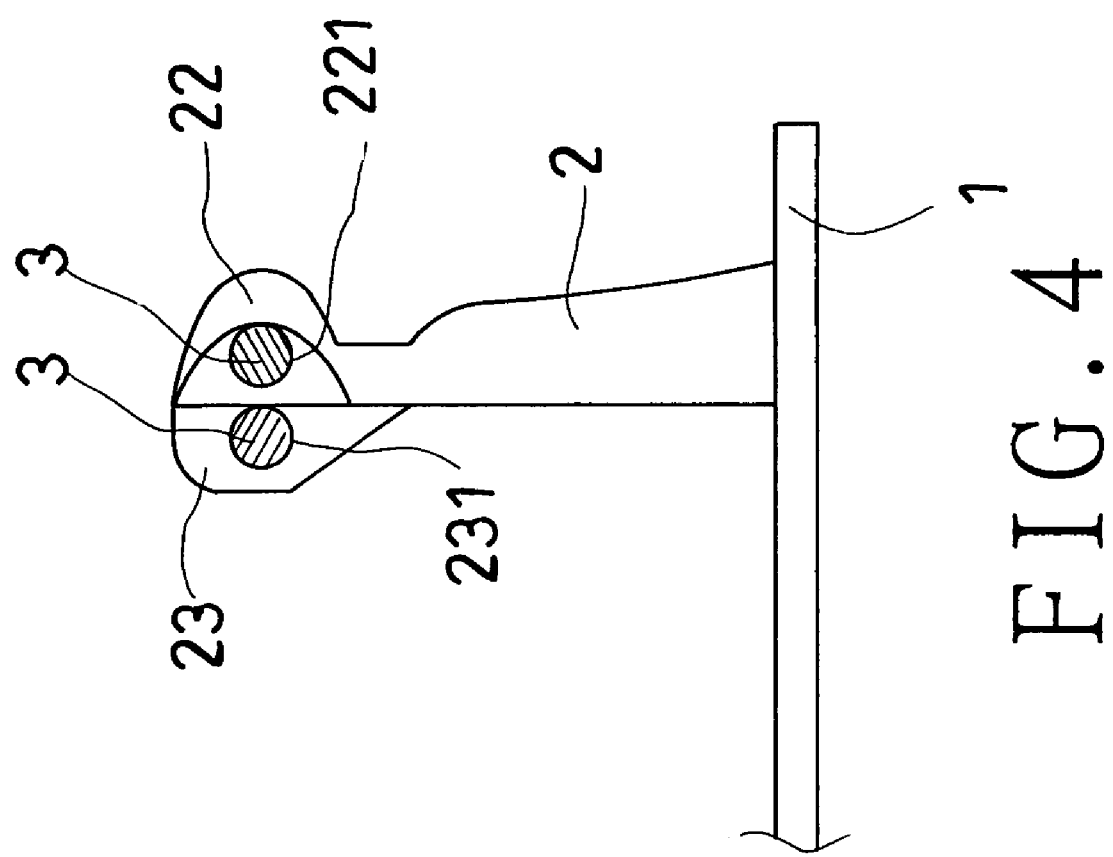
FIG. 4 is lateral sectional view of the first embodiment in use.
Figure 5:
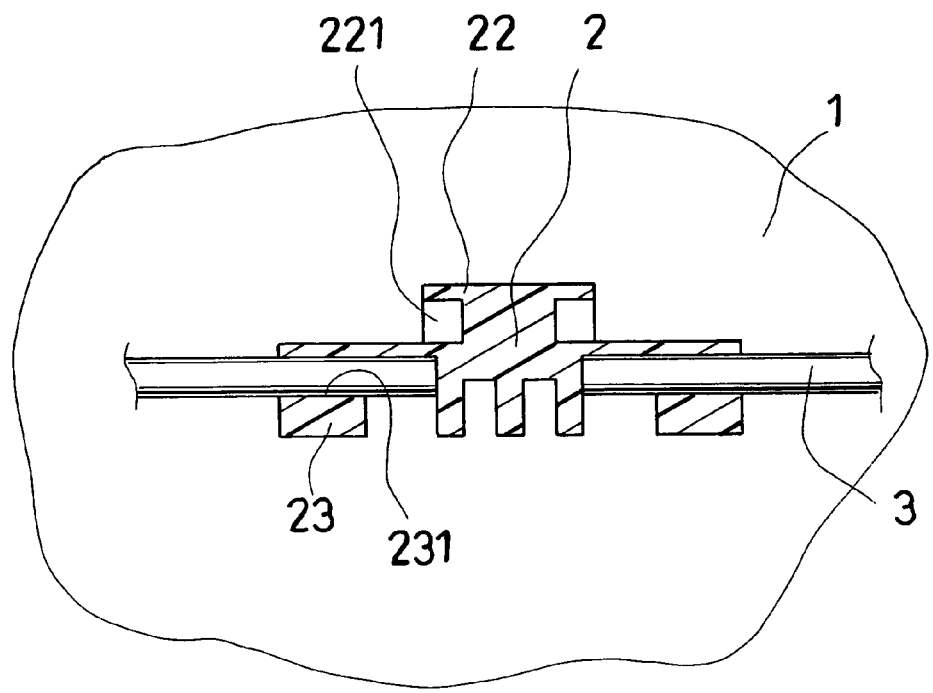
FIG. 5 is a cross-sectional view of the first embodiment in use.
Figure 6:
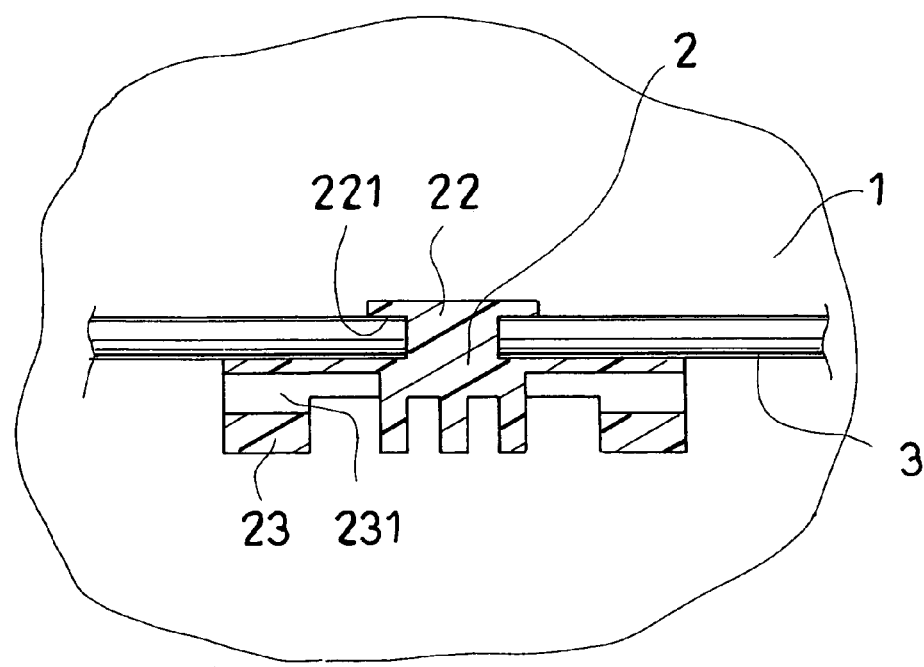
FIG. 6 is a cross-sectional view of the second embodiment in use.
Figure 7:
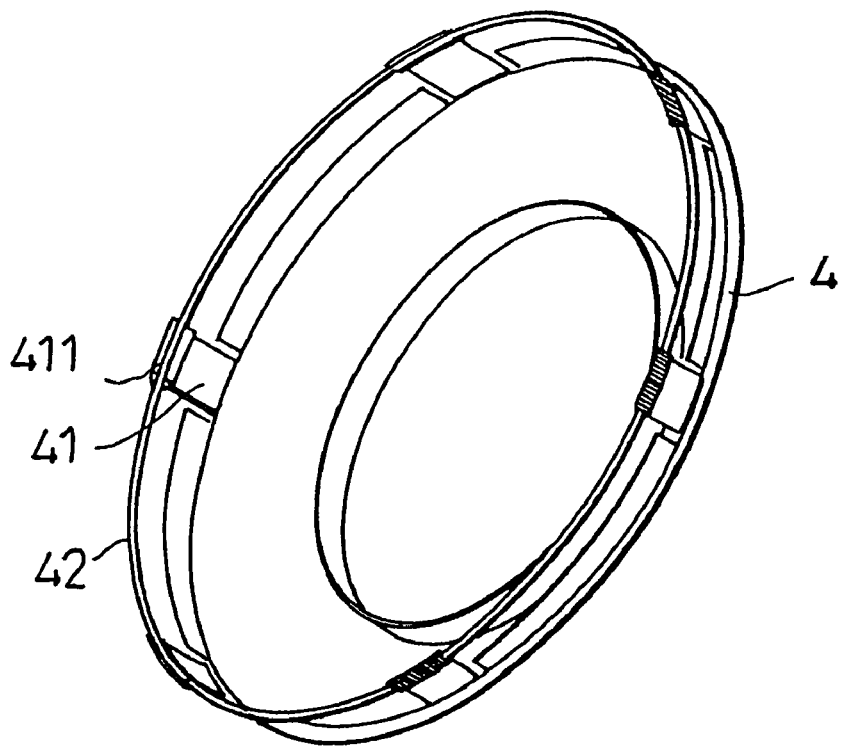
FIG. 7 is a perspective view of the first conventional wheel cover.
Figure 8:
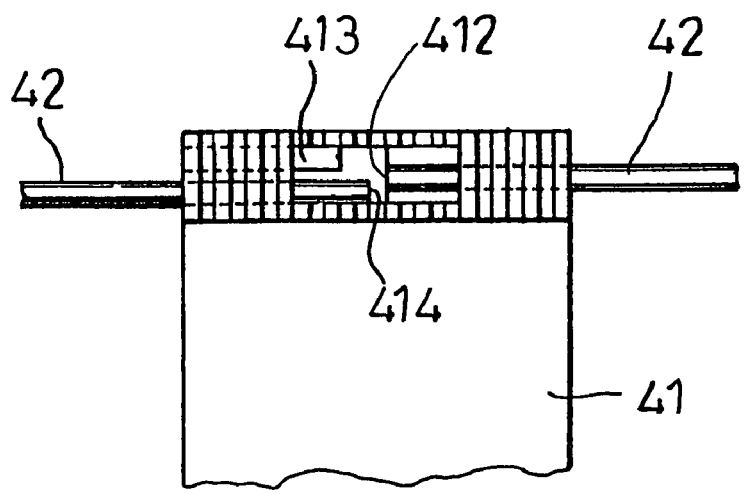
FIG. 8 is a partial view of the first conventional wheel cover.
Figure 9:
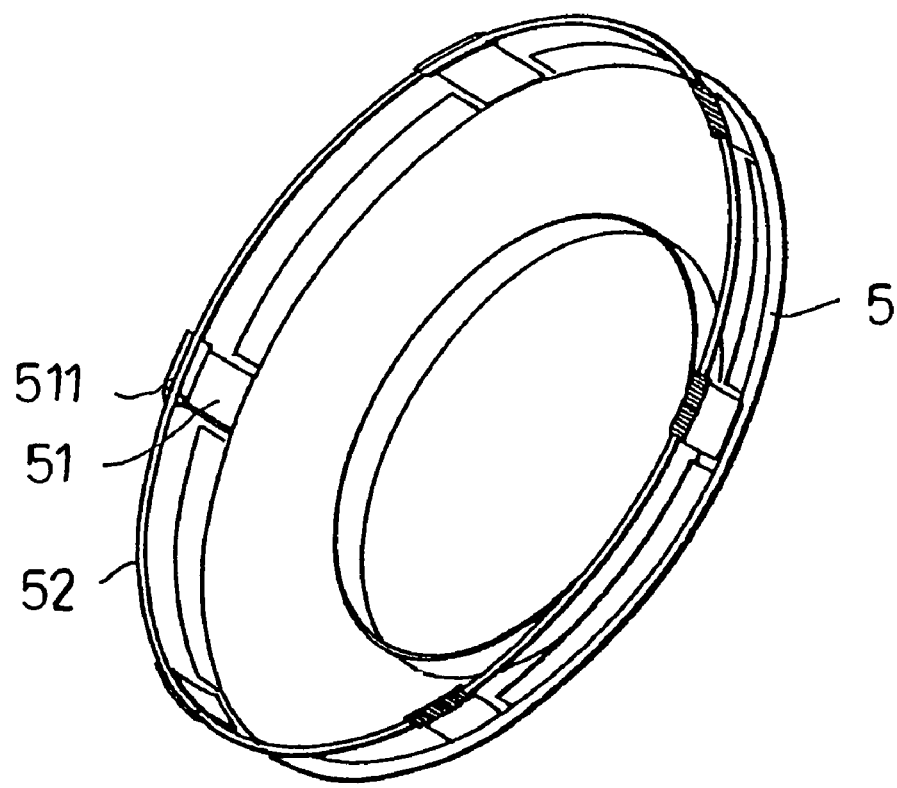
FIG. 9 is a perspective view of the second conventional wheel cover.
Figure 10:
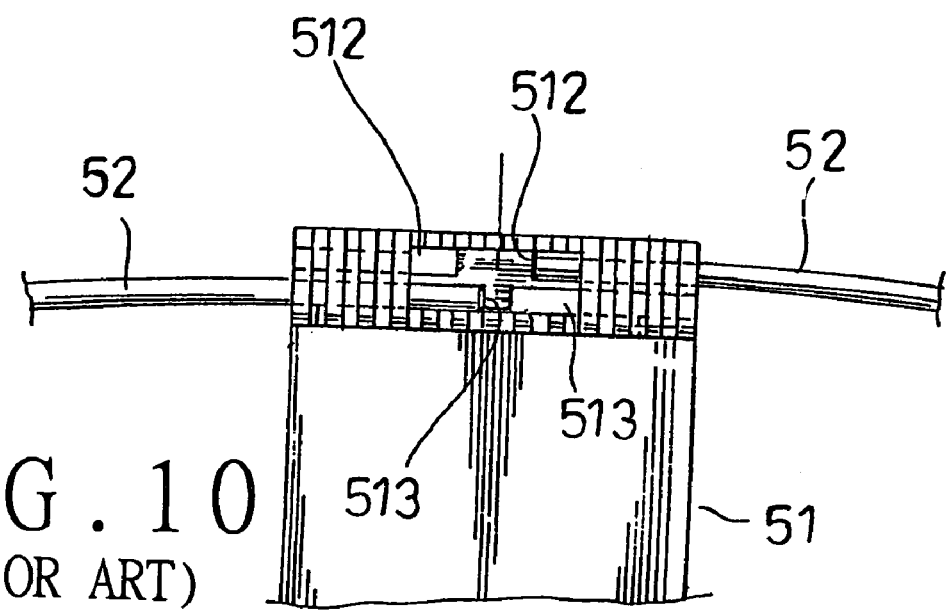
FIG. 10 is a partial view of the second conventional wheel cover.

A steel ring 3, which has a gap, is inserted in chosen ones of the holes 221 and 231 of the first securing part 2 at the two free ends thereof, as shown in FIGS. 4 to 6. And, the steel ring 3 is fitted in all the holding spaces 21 of the securing parts 2 except that of the first securing part 2 such that the free ends of all the securing parts 2 are outwards displaced by means of the steel ring 3; the holes 221 and 231 for connection with the steel ring 3 are chosen according to the size of the steel ring 3 such that the free ends of the securing parts 2 are effectively displaced outwards. Consequently, the securing parts 2 will be tightly pressed against an inward edge of a wheel with the detained portions 22 preventing the wheel cover 1 from falling off.

Because the first securing part 2 has several holes 221 and 231 on each of the two ends, steel rings of different sizes can be inserted in their suitable ones of the holes 221 and 231 at two free ends thereof for making the wheel cover 1 firmly held on a wheel. Furthermore, because the holes 221 and 231 on the first securing part 2 are coplanar, i.e. at the same distance from the surface of the wheel cover 1, although steel rings of different sizes have to be inserted into different holes 221 and 231, their moment arms of force will be equal. Therefore, there can't be reduction in moment arm of force owing to changing steel rings, and the moment of force produced by any size of steel ring will be enough for making the securing parts 2 outwards displaced to a proper position.

From the above description, it can be easily seen that steel rings of different sizes can be used on the wheel cover, and they can effectively displace the securing parts outwards for making the wheel cover firmly held on a wheel without risk of falling off.

What is claimed is:

1. A steel ring adjustment structure of a wheel cover, comprising a plurality of securing parts equidistantly spaced apart around an outer periphery of the wheel cover; the securing parts each having a holding space on an inward side thereof, and a detained portion on an outward side thereof; a first one of the securing parts being formed with a protruding portion on the inward side; the protruding portion having a plurality of holes on each of two ends thereof; the detained portion of the first securing part having a plurality of holes on each of two ends thereof; all the holes on the first securing part being coplanar with respect to a plane disposed in parallel relationship to a main body of the wheel cover, and thereby being substantially equidistantly spaced from a surface of the wheel cover; and a steel ring having a gap; the steel ring being inserted in the holes of the protruding portion and the detained portion of the first securing part at two free ends thereof; the steel ring being fitted in all the holding spaces of the securing parts except that of the first securing part such that the steel ring displaces all free ends of the securing parts radially, and the securing parts are pressed against an inward edge of a wheel with the detained portions preventing the wheel cover from falling off.

* * * * *